(12) United States Patent
Walsh

(10) Patent No.: US 6,248,279 B1
(45) Date of Patent: Jun. 19, 2001

(54) METHOD AND APPARATUS FOR ENCAPSULATING A RING-SHAPED MEMBER

(75) Inventor: Edward Brian Walsh, Mt. Prospect, IL (US)

(73) Assignee: PANZER Tool Works, Inc., Elk Grove Village, IL (US)

( * ) Notice: Subject to any disclaimer, the term of this patent is extended or adjusted under 35 U.S.C. 154(b) by 0 days.

(21) Appl. No.: 09/318,336

(22) Filed: May 25, 1999

(51) Int. Cl.$^7$ .......................... B29C 33/12; B29C 33/76; B29C 45/14; B29C 70/70; B29C 71/02

(52) U.S. Cl. .............. 264/254; 264/272.15; 264/272.19; 264/278; 264/346

(58) Field of Search ...................................... 264/250, 254, 264/255, 271.1, 272.15, 272.19, 272.2, 275, 278, 326, 346; 425/129.1, 577, 120, 121, 125

(56) References Cited

U.S. PATENT DOCUMENTS

| | | |
|---|---|---|
| 1,808,047 * | 6/1931 | Littleton, Jr. et al. ................ 264/275 |
| 2,058,938 * | 10/1936 | Apple .................. 264/272.2 |
| 3,311,690 * | 3/1967 | Fischer ................... 264/278 |
| 3,351,691 * | 11/1967 | Wilford .............. 264/271.1 |
| 3,484,516 * | 12/1969 | Simons .............. 264/271.1 |
| 3,859,719 | 1/1975 | Gostyn et al. . |
| 4,227,120 | 10/1980 | Luborsky . |
| 4,262,233 | 4/1981 | Becker et al. . |
| 4,649,639 | 3/1987 | Mas . |
| 4,782,582 | 11/1988 | Venezia . |
| 5,049,344 * | 9/1991 | Sorenson ................ 264/255 |
| 5,242,760 | 9/1993 | Matsuoka et al. . |
| 5,372,491 * | 12/1994 | Fritsch et al. ............ 425/130 |
| 5,447,674 * | 9/1995 | Schellenbach ............ 264/268 |
| 5,470,646 | 11/1995 | Okamura et al. . |
| 5,583,475 | 12/1996 | Raholijaona et al. . |
| 5,705,112 * | 1/1998 | Gram ................... 263/255 |
| 5,787,569 | 8/1998 | Lotfi et al. . |

* cited by examiner

Primary Examiner—Angela Ortiz
(74) Attorney, Agent, or Firm—Pauley Petersen Kinne & Fejer

(57) ABSTRACT

A method and apparatus for encapsulating a ring-shaped member, such as a wound coil of wire, a wound metal ribbon, or a metal composite material. The ring-shaped member is mounted upon a mandrel. The mandrel and the mounted ring-shaped member are positioned in a first mold. A thermoplastic material is injection molded peripherally about a first inner void between the mandrel and the ring-shaped member and a first outer void between the first mold and the ring-shaped member. The mandrel is moved with respect to the ring-shaped member. The mandrel and the re-mounted ring-shaped member are positioned in a second mold. The thermoplastic material is injection molded into a second inner void between the mandrel and the ring-shaped member and within a second outer void between the second mold and the ring-shaped member. The second fill of the thermoplastic material joins with the first fill to fully encapsulate the ring-shaped member. The encapsulated ring-shaped member can then be annealed or heat treated to stress relieve any undesired stress or tension within the ring-shaped member.

19 Claims, 4 Drawing Sheets

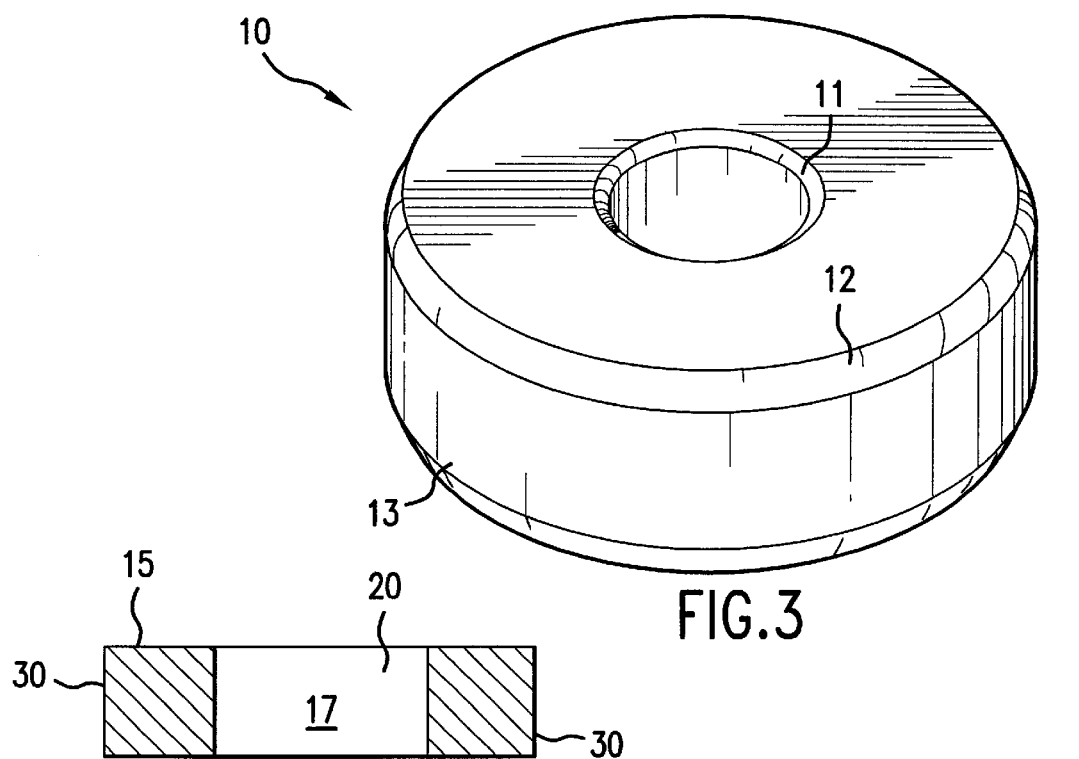
FIG.3
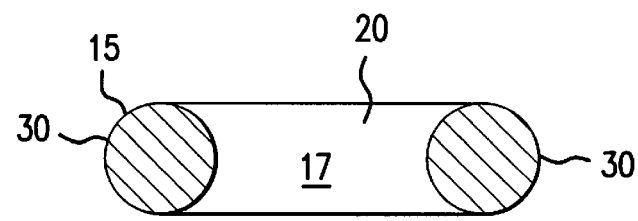
FIG.5
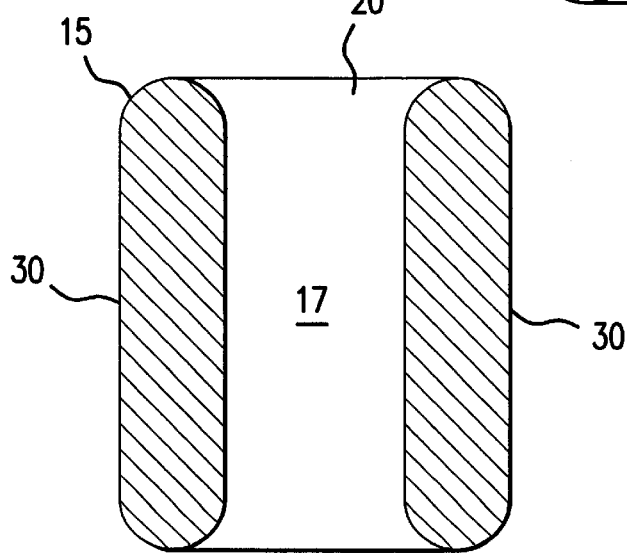
FIG.4
FIG.6

METHOD AND APPARATUS FOR ENCAPSULATING A RING-SHAPED MEMBER

BACKGROUND OF THE INVENTION

1. Field of the Invention

This invention relates to a method and apparatus for encapsulating a ring-shaped member, such as a wound coil of wire, with a casing having a relatively constant thickness and rounded edges, and wherein the encapsulated ring-shaped member is stress-relieved.

1. Description of Prior Art

Conventional methods have been used to encapsulate ring-shaped members, such as wound coils of wire. For example, wound coils have been dipped in an epoxy material or an enamel material. The dipping process results in a coated or encapsulated wound coil. However, the wall thickness of the coating can significantly differ because of manufacturing inconsistencies associated with different variables, such as materials and gravity effects.

In other conventional methods, a wound coil is encased by positioning the wound coil within a prefabricated casing or housing having two or more pieces. The multiple casing or housing pieces are then welded, adhered or otherwise sealed or mechanically connected with respect to each other.

The different conventional methods for encapsulating a ring-shaped member produce casings with variable wall thicknesses and casing that have exposed sharp edges. Encapsulated wound coils are used to manufacturer toroidal coils, wherein a wire is wound in a toroidal fashion about the casing of an encapsulated wound coil. Inconsistent casing thicknesses can result in inaccurate toroidal windings. Because tension is applied to a toroidal wire during a winding process, a sharp casing edge can sever and thus break the toroidal wire during the winding process.

There is an apparent need for a method and apparatus for encapsulating a wound coil, wherein the casing has a relatively constant thickness with no exposed sharp edges, to provide a base for winding a consistent and accurate toroidal coil, particularly without breaking the toroidal wire. Also, there is a need to provide a method and apparatus for mass producing at relatively high production speeds an encapsulated ring-shaped member, such as a wound coil.

SUMMARY OF THE INVENTION

It is one object of this invention to provide a method and apparatus for encapsulating a ring-shaped member using a controlled injection molded thermoplastic material.

It is one object of this invention to provide a method for annealing or heat treating on encapsulated ring-shaped member to stress relieve the ring-shaped member.

It is another object of this invention to provide an encapsulated ring-shaped member which has a casing with rounded external comers or edges.

It is another object of this invention to provide an encapsulated ring-shaped member having a casing of relatively constant wall thickness.

It is another object of this invention to provide a method and apparatus for precisely reproducing a particular size and shape of a casing used to encapsulate a ring-shaped member.

As used throughout this specification and in the claims, the term ring-shaped member can be interchanged with the term wound coil. It is apparent that the ring-shaped member and/or the wound coil can have any suitable cross-sectional shape, as further discussed later in this specification.

The above and other objects of this invention are accomplished with a method for mass producing large quantities of encapsulated ring-shaped members, particularly at relatively high production speeds, using controlled injection molding techniques as described in this specification.

In one preferred embodiment of this invention, a mandrel is positioned within an opening formed by a ring-shaped member. The mandrel can be shaped to form a first inner void between the mandrel and at least a portion of an inner surface of the ring-shaped member. The first inner void preferably extends about an entire periphery of and between an external surface of the mandrel and an internal surface of the ring-shaped member. Thus, the first inner void is preferably formed as a peripheral void or an annular void.

The mandrel and the ring-shaped member mounted with respect to the mandrel are positioned within a first mold. In one preferred embodiment according to this invention, the first mold and the ring-shaped member form a first outer void about a periphery of the ring-shaped member. The first mold and the ring-shaped member also preferably form a first annular void that joins both the first inner void and the first outer void.

In a first fill, a thermoplastic material is injected into and fills or occupies the first inner void, the first annular void and the first outer void.

In one preferred embodiment according to this invention, a sleeve is positioned over the mandrel, near the ring-shaped member. A peripheral edge of the sleeve preferably forms a boundary of the first inner void. The peripheral edge has an undercut that forms a curved surface at the boundary of the first inner void. The curved surface forms a rounded corner on an external surface of an inner periphery of the casing.

After forming the first fill, the mandrel, the mounted ring-shaped member and a partially formed casing are removed from the first mold. The mandrel is then moved with respect to the ring-shaped member to form a second inner void between the mandrel and a second portion of the peripheral inner surface of the ring-shaped member. Then, the mandrel and the re-mounted ring-shaped member are positioned in a second mold. In one preferred embodiment of this invention, the second mold and a remaining portion of the peripheral outer surface of the ring-shaped member forms a second outer void. The thermoplastic material of the first fill occupying the first outer void is exposed to the second outer void, which preferably extends about a periphery of the outer surface of the ring-shaped member. The second mold and the ring-shaped member preferably form a second annular void that joins both the second inner void and the second outer void.

The thermoplastic material, which can be the same or a different thermoplastic material as used in the first fill, is injected into and occupies the second inner void, the second annular void and the second outer void. In one preferred embodiment according to this invention, the second fill joins, knits or bonds with the first fill and encases the ring-shaped member, preferably but not necessarily in an air-tight manner.

Depending upon the design of the second mold, the sleeve can be removed before or after the mandrel and the ring-shaped member are positioned within the second mold. After the second fill is complete, the mandrel and the encased ring-shaped member are removed from the second mold. After removing the mandrel and the ring-shaped member from the second mold, a comb or a knockout device can be used to eject the coil from the mandrel.

In one preferred embodiment according to this invention, the encapsulated ring-shaped member can then be annealed or heat treated, for example, to a temperature that is sufficient to anneal and thus stress-relieve any undesirable tension within the ring-shaped member. Undesirable tension may be caused by the injection molding method of this invention.

Because the casing is injection molded, according to this invention, wall thicknesses along the casing are relatively constant. Also because of the injection molding according to this invention, the casing can be reproduced with precise dimensions and shapes. By using the sleeve with the undercut, according to this invention, all external edges of the casing can be rounded.

With the method and apparatus according to this invention, the mandrel can be moved with respect to the ring-shaped member, such as a wound coil, without friction or shear forces distorting the shape of the wound coil. Also, with the method and apparatus according to this invention, the encased wound coil can be stress-relieved with a heat treating or an annealing step.

BRIEF DESCRIPTION OF THE DRAWINGS

FIG. 3 is a perspective view of an encased ring-shaped member, according to one preferred embodiment of this invention; and FIGS. 4–6 are cross-sectional views each showing a different cross-sectional shape of a ring-shaped member according to different embodiments of this invention.

DESCRIPTION OF PREFERRED EMBODIMENTS

Figure 1:
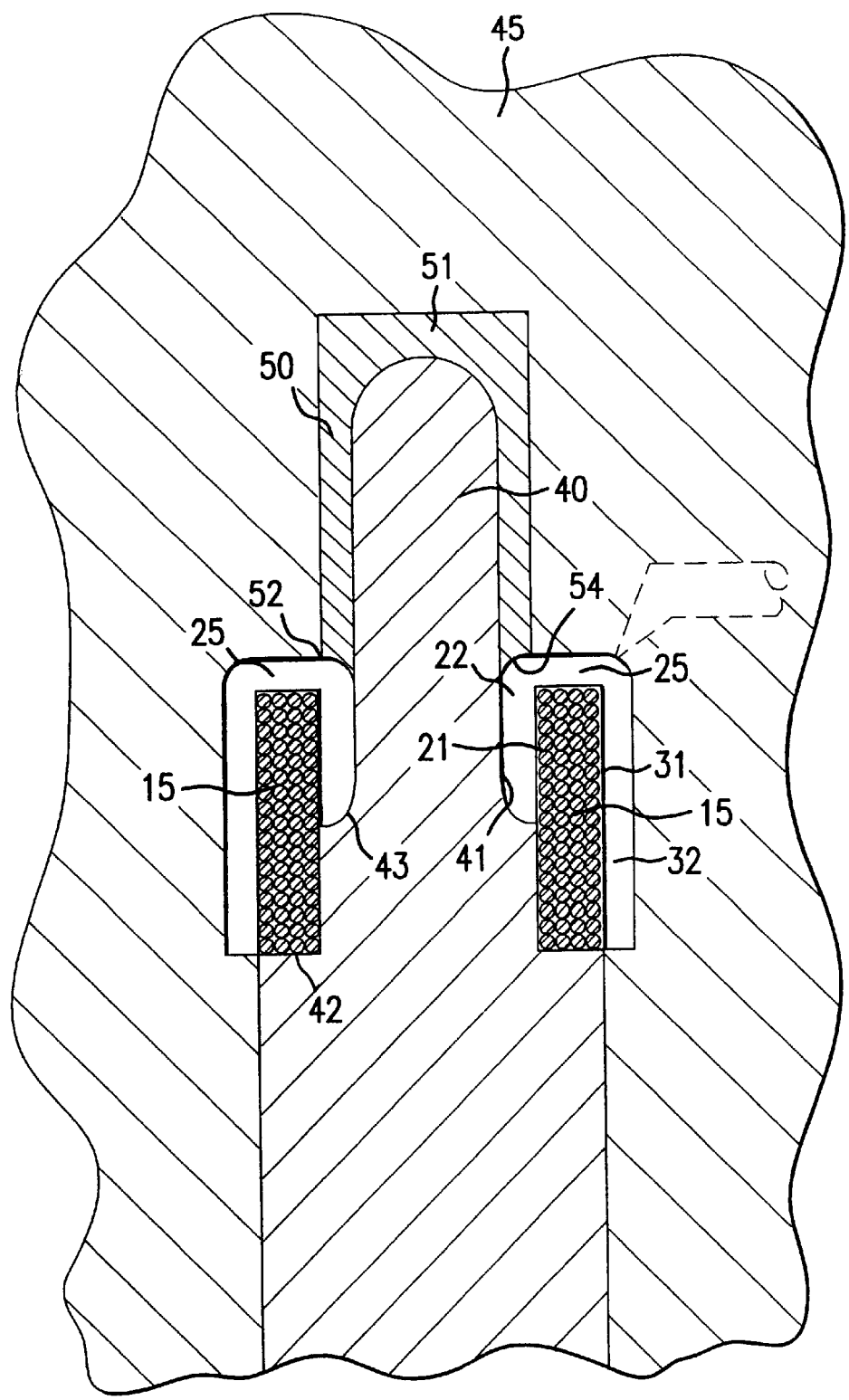
FIG. 1 shows a cross-sectional view of a ring-shaped member mounted on a mandrel and a sleeve mounted on the mandrel, wherein the mandrel is positioned within a first mold, according to one preferred embodiment of this invention.
Figure 2:
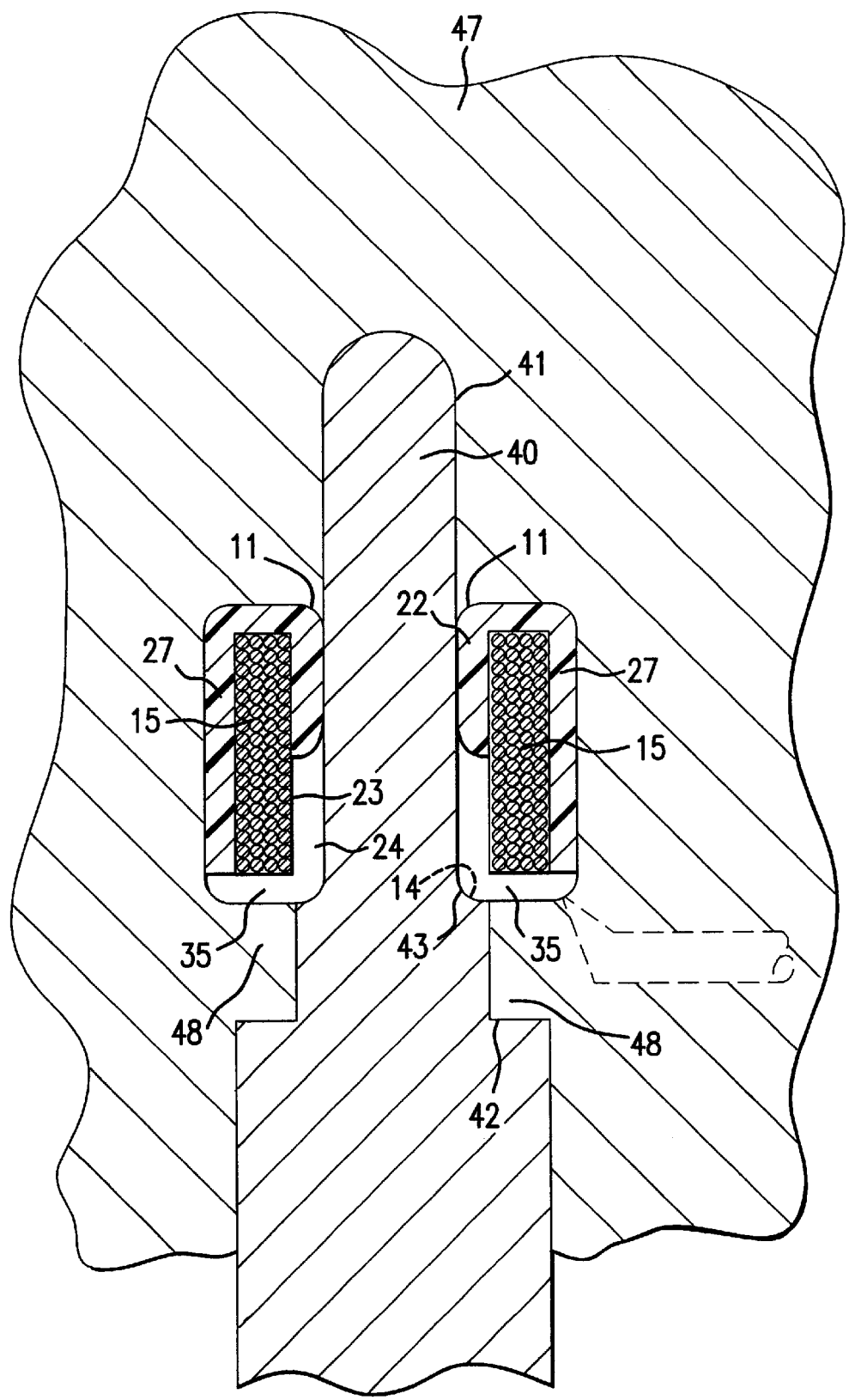
FIG. 2 is a cross-sectional view of the ring-shaped member re-mounted upon the mandrel and positioned in a second mold, according to one preferred embodiment of this invention.
Figure 2A:
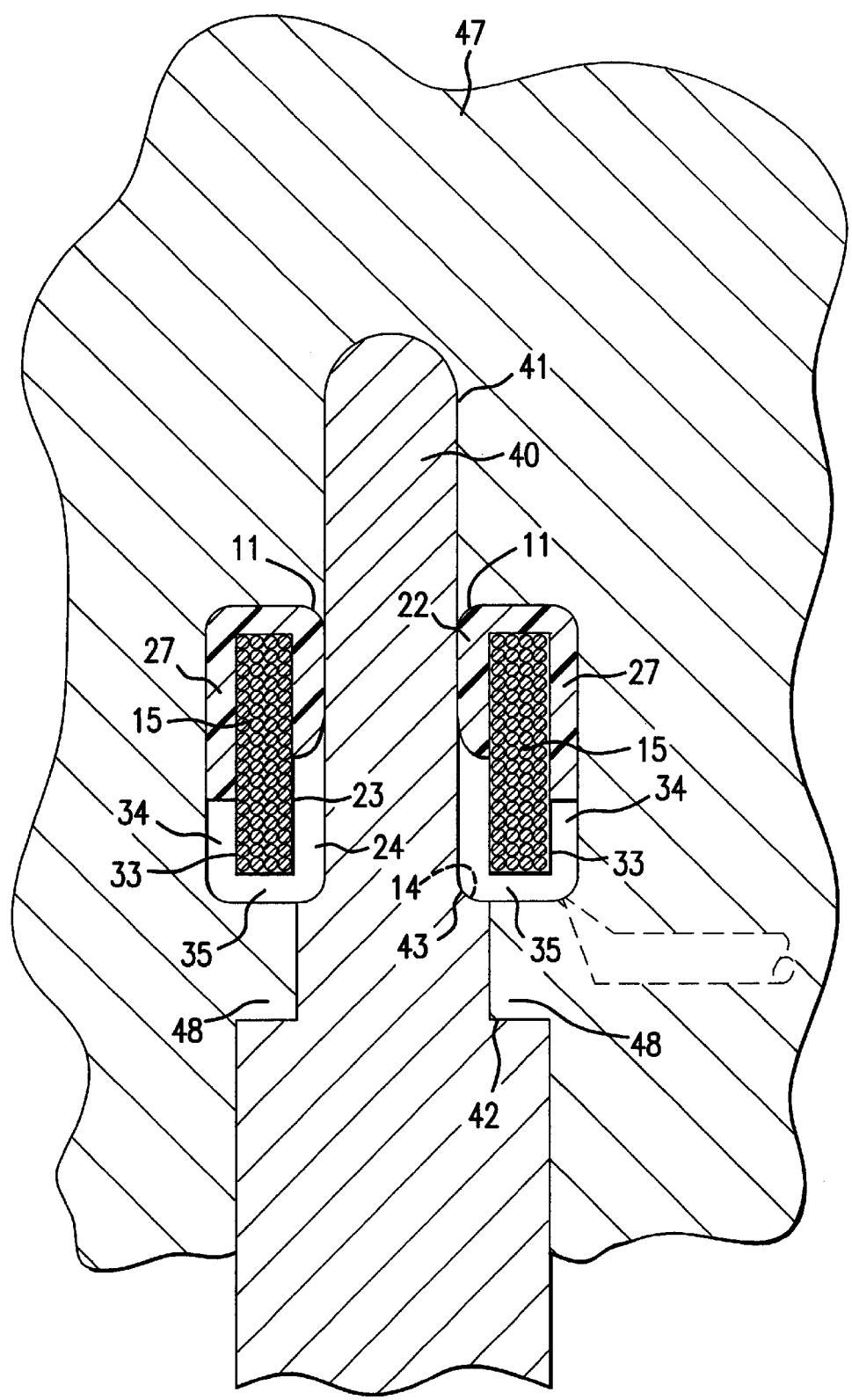
FIG. 2A is a cross-sectional view of the ring-shaped member re-mounted upon the mandrel and positioned in a second mold, according to another preferred embodiment of this invention.

FIGS. 1 and 2 show cross-sectional views of two different injection molding method steps, according to one preferred embodiment of this invention. FIG. 2A shows a cross-sectional view of a second molding step, according to another preferred embodiment of this invention. FIG. 3 shows a perspective view of casing 10 which encapsulates ring-shaped member 15, according to one preferred embodiment of this invention. The method and apparatus of this invention result in casing 10 having rounded edges where two walls of casing 10 meet. As shown in FIG. 3, casing 10 forms inner rounded edge 11 and outer rounded edges 12, 13. Depending upon the particular cross-sectional shape of ring-shaped member 15 and thus casing 10, casing 10 can have more or less than four rounded edges. The embodiment shown in FIGS. 1–3 has four rounded edges 11–14, three of which are shown in FIG. 3.

Ring-shaped member 15 may comprise a solid or rigid ring with any suitable cross-sectional shape, such as shown in FIGS. 4–6. Ring-shaped member 15 may also comprise a wound coil of wire, such as shown in FIGS. 1, 2 and 2A, a wound metal ribbon, or a metal composite material such as one including a ferrite material. In one preferred embodiment according to this invention, the method is particularly suitable for encapsulating a wound coil of wire. Quite often the wound coil is relatively small. Once encapsulated, the wound coil can be used to create a toroidal coil. Toroidal coils are known to those skilled in the art of electronics and magnetism. As used in the following detailed description of the invention, the term wound coil 15 is used interchangeably with the term ring-shaped member 15. Thus, the following discussion and technical specification can also relate to any other suitable ring-shaped member, such as those shown in FIGS. 4–6, in lieu of the wound coil shown in FIGS. 1 and 2.

In one preferred embodiment according to this invention, a method for encapsulating wound coil 15 begins with mounting wound coil 15 upon mandrel 40. For example, mandrel 40 can be positioned within opening 17, shown in FIGS. 4–6, of wound coil 15. Wound coil 15 is moved with respect to mandrel 40 until wound coil 15 abuts shoulder 42 of mandrel 40, as shown in FIG. 1. It is apparent that any other suitable mechanical or structural stop can be used in lieu of or in addition to shoulder 42, to limit movement of wound coil 15 with respect to mandrel 40.

Once wound coil 15 is mounted upon mandrel 40, the assembled unit is positioned within first mold 45, as shown in FIG. 1. FIG. 1 schematically shows, in dashed lines, an inlet through which a thermoplastic material can flow. Suitable inlets are known to those skilled in the art of injection molding.

As shown in FIG. 1, with wound coil 15 mounted with respect to mandrel 40, at least a portion 21 of inner surface 20, shown in FIGS. 4–6, of wound coil 15 and outer surface 41 of mandrel 40 form inner void 22.

As shown in FIGS. 1–3, wound coil 15 has a generally circular overall shape and thus inner void 22 is an annular void. However, it is apparent that wound coil 15 can have a non-circular overall shape and in such preferred embodiment, inner void 22 is a peripheral void. As used throughout this specification and in the claims, the term peripheral void is intended to include the void formed between outer surface 41 of mandrel 40 and inner surface 20 of wound coil 15, whether wound coil 15 has a circular or non-circular overall shape.

When positioned within first mold 45, as shown in FIG. 1, at least a portion 31 of peripheral outer surface 30 of wound coil 15 and first mold 45 form peripheral outer void 32. In one preferred embodiment according to this invention, first mold 45 and wound coil 15 form annular void 25 which preferably joins with or connects with both inner void 22 and outer void 32.

A first fill, through controlled injection processing, of a thermoplastic material, or any other suitable injection molding material, is injected or otherwise flows into and fills or occupies inner void 22, annular void 25 and outer void 32. In one preferred embodiment of this invention, the controlled injection processing monitors and adjust magnitude and/or rates of different variables, such as temperature, pressure and time.

As shown in FIG. 1, sleeve 50 is positioned over and mounted on mandrel 40. Sleeve 50 comprises peripheral edge 52 which preferably but not necessarily has curved surface 54. Sleeve 50 can be stopped in a particular position with respect to mandrel 40. As shown in FIG. 1, sleeve 50 has cap portion 51 that abuts mandrel 40 and thus stops movement of sleeve 50 with respect to mandrel 40. It is apparent that any other suitable mechanical or structural stop can be used to position curved surface 54 to form inner rounded edge 11 of casing 10, as shown in FIG. 1. Sleeve 50 is preferably positioned to form a relatively constant thickness of casing 10 where inner void 22 meets annular void 25.

After the first fill of thermoplastic material is complete, mandrel 40, wound coil 15 and sleeve 50 are removed from first mold 45. Then, mandrel 40 is moved with respect to wound coil 15, such as from the position shown in FIG. 1 to the position shown in FIG. 2. As shown in FIG. 2, second mold 47 comprises step 48 to fill the gap formed when mandrel 40 and thus shoulder 43 are moved with respect to wound coil 15.

One advantage of the method according to this invention is that first fill 27 forms a bushing surface, shown in FIG. 2, against which mandrel 40 can slide and thus retain the partially encased winding to further and finish encapsulation of wound coil 15. As shown in FIG. 1, inner void 22 extends approximately one-half of an axial length of wound coil 15. It is apparent that inner void 22 can extend more or less, depending upon the characteristics of wound coil 15. In many wound coils, moving mandrel 40 against the entire inner surface 20 of wound coil 15 would distort, deform or cause wound coil 15 to pull apart.

With mandrel 40 and wound coil 15 within second mold 47, remaining portion 23 of inner surface 20 and mandrel 40 form inner void 24. As shown in FIGS. 2 and 2A, shoulder 43 of mandrel 40 is moved into a position that forms inner rounded edge 14 of casing 10. As shown in the preferred embodiment of FIG. 2A, second mold 47 and remaining portion 33 of outer surface 30 of wound coil 15 forms peripheral outer void 34. It is also possible to form either no outer void 34 or a relatively small outer void 34, as shown in the preferred embodiment of FIG. 2.

Step 48, a portion of mandrel 40 near shoulder 43, and wound coil 15 form annular void 35. Annular void 35 preferably joins with or connects with both inner void 24 and outer void 34. A second controlled fill of the thermoplastic material is injected into inner void 24, outer void 34 and annular void 35.

The second fill of the thermoplastic material melds, joins, fuses, knits or bonds with first fill 27 of the thermoplastic material. In one preferred embodiment according to this invention, both the first fill and the second fill are of the same thermoplastic material. However, it is apparent that the first fill can be of a different thermoplastic material than the second fill. Also, as used throughout this specification and in the claims, the term thermoplastic material is intended to include any suitable polymeric material known to those skilled in the art of injection molding, including materials such as nylon, polycarbonate, polyester or any other suitable injection molding material.

After the second fill is complete, the first fill and the second fill encapsulate wound coil 15. In one preferred embodiment according to this invention, casing 10 forms an air-tight closure. However, it is apparent that casing 10 may also be vented. An air-tight closure is suitable but normally not necessary for producing a toroidal coil.

When mandrel 40, wound coil 15 and sleeve 50 are removed from first mold 45, the combined elements are indexed or moved to and positioned in second mold 47, as shown in FIGS. 2 and 2A. Mandrel 40 can be indexed or moved according to any robotic, automatic or manual method known to those skilled in the art. As shown in FIGS. 2 and 2A, sleeve 50 is removed and not positioned within second mold 47. However, it is apparent that second mold 47 can be shaped to accommodate sleeve 50, so that removal of sleeve 50 with respect to mandrel 40 is not necessary. Also, shoulder 42 of mandrel 40 can be formed as an integral part of mandrel 40, as shown in FIGS. 1 and 2, or shoulder 42 can be formed by two separate elements, such as a sleeve mounted about mandrel 40.

When encapsulated casing 10 is finished after the second fill, mandrel 40 can be indexed or removed from second mold 47. A suitable comb, knockout device or other mechanical element known to those skilled in the art of injection molding can be used to eject or remove encased wound coil 15 from mandrel 40.

With certain wound coils 15, the injection molding method of this invention may result in undesired stress or tension within wound coil 15. In one preferred embodiment of this invention, casing 10 and encapsulated wound coil 15 can be annealed by heat treating casing 10 and encapsulated wound coil 15. For example, the annealing or heat treating can be accomplished by raising encapsulated wound coil 15 to a temperature that stress relieves or tension relieves wound coil 15. It is apparent that the particular temperature and time duration of the heat treating process is a function of the material of wound coil 15 and/or the particular thermoplastic material. For example, casing 10 constructed of acrylic butyrate styrene can be raised to a temperature of approximately 280° F., whereas an encapsulated casing 10 constructed of polyester can be raised to a temperature of approximately 350° F., again depending upon the particular composition of wound coil 15. The heat treating or annealing process relieves stresses within wound coil 15.

The method for encapsulating wound coil or ring-shaped member 15 of this invention results in casing 10 having wall thicknesses that are approximately constant. For example, as shown in FIGS. 2 and 2A, except for inconsistencies at rounded edges 11–14, wall thicknesses of casing 10 are generally constant. It is apparent that injection molding a thermoplastic material results in more consistent multiple casings 10 than can be accomplished with other conventional production methods, such as dipping in enamel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for encapsulating a ring-shaped member, comprising the steps of:

positioning a mandrel within an opening of the ring-shaped member and forming a peripheral first inner void between the mandrel and at least a portion of a peripheral inner surface of the ring-shaped member;

positioning a sleeve over the mandrel and near the ring-shaped member to form a boundary of the first inner void, wherein a peripheral edge of the sleeve has an undercut which forms a curved surface at the boundary of the first inner void;

filling the first inner void with a first fill of a thermoplastic material;

moving the mandrel with respect to the ring-shaped member and forming a peripheral second inner void between the mandrel and a second portion of the peripheral inner surface of the ring-shaped member; and filling the second inner void with a second fill of the thermoplastic material.

2. In the method according to claim 1 wherein the mandrel and the ring-shaped member mounted with respect to the mandrel is positioned within a first mold.

3. In the method according to claim 2 wherein the first mold and at least a portion of a peripheral outer surface of the ring-shaped member forms a peripheral first outer void.

4. In the method according to claim 3 wherein the first fill of the thermoplastic material occupies the first outer void.

5. In the method according to claim 3 wherein after the second inner void is formed the ring-shaped member mounted with respect to the mandrel is positioned in a second mold.

6. In the method according to claim 5 wherein the second mold and a remaining portion of the peripheral outer surface of the ring-shaped member forms a peripheral second outer void.

7. In the method according to claim 6 wherein the second fill of the thermoplastic material fills the second outer void.

8. In the method according to claim 7 wherein the first fill and the second fill encapsulate the ring-shaped member.

9. In the method according to claim 1 wherein the ring-shaped member is a wound coil and the encapsulated wound coil is annealed.

10. In the method according to claim 9 wherein the encapsulated wound coil is annealed by heat treating the encapsulated wound coil.

11. In the method according to claim 1 wherein the first fill and the second fill encapsulate the ring-shaped member.

12. In the method according to claim 11 wherein the encapsulated ring-shaped member is annealed.

13. In the method according to claim 12 wherein the encapsulated ring-shaped member is annealed by heat treating the encapsulated ring-shaped member.

14. A method for encapsulating a ring-shaped member, comprising the steps of:

positioning a mandrel within an opening of the ring-shaped member and forming a peripheral first inner void between the mandrel and at least a portion of a peripheral inner surface of the ring-shaped member, wherein movement of the mandrel into the opening of the ring-shaped member is stopped by the ring-shaped member abutting a shoulder of the mandrel, and wherein an undercut forms a curved surface at a boundary of the first inner void;

filling the first inner void with a first fill of a thermoplastic material;

moving the mandrel with respect to the ring-shaped member and forming a peripheral second inner void between the mandrel and a second portion of the peripheral inner surface of the ring-shaped member; and filling the second inner void with a second fill of the thermoplastic material.

15. In the method according to claim 1 wherein the second inner void is adjacent the first fill.

16. In the method according to claim 1 wherein the second fill melds to the first fill.

17. In the method according to claim 1 wherein the mandrel is moved with respect to the ring-shaped member after the first inner void is filled with the thermoplastic material.

18. A method for encapsulating a ring-shaped member, comprising the steps of:

positioning a mandrel within an opening of the ring-shaped member and forming a peripheral first inner void between the mandrel and at least a portion of a peripheral inner surface of the ring-shaped member and forming a peripheral first outer void between a first mold and at least a portion of a peripheral outer surface of the ring-shaped member;

filling at least a portion of the first inner void and at least a portion of the first outer void with a first fill of a thermoplastic material;

moving the mandrel with respect to the ring-shaped member and forming a peripheral second inner void between the mandrel and a second portion of the peripheral inner surface of the ring-shaped member; and filling the second inner void with a second fill of the thermoplastic material.

19. In the method according to claim 18 wherein after the first fill of the thermoplastic material the mandrel and the ring-shaped member are moved to a second mold.

* * * * *